United States Patent [19]

Leidecker et al.

[11] Patent Number: 4,930,601
[45] Date of Patent: Jun. 5, 1990

[54] LUBRICATION SYSTEM FOR A TRANSMISSION MECHANISM

[75] Inventors: Henry A. Leidecker, Libertyville, Ill.; Gary R. Woerman, Queen Creek, Ariz.

[73] Assignee: J. I. Case Company, Racine, Wis.

[21] Appl. No.: 308,270

[22] Filed: Feb. 9, 1989

[51] Int. Cl.$^5$ .............................................. F01M 9/00
[52] U.S. Cl. .................. 184/6.12; 184/6.11; 384/389
[58] Field of Search ................ 184/6.11, 6.12; 384/475, 474, 389

[56] References Cited

U.S. PATENT DOCUMENTS

| | | | |
|---|---|---|---|
| 2,926,755 | 3/1960 | Kolbe | 184/6.12 |
| 3,380,555 | 4/1968 | Myers | 184/6.12 |
| 3,637,049 | 1/1972 | Butterfield et al. | 184/6.12 |
| 4,231,266 | 11/1980 | Nishikawa et al. | 184/6.12 |

*Primary Examiner*—Allen M. Ostrager
*Attorney, Agent, or Firm*—Dressler, Goldsmith, Shore, Sutker & Milnamow, Ltd.

[57] ABSTRACT

A lubricating system for a mechanism having a rotatable shaft supported in a housing by bearings. The lubrication system includes an open-ended axially extending fluid passage defined by the shaft, a fluid conduit defined by the housing, and a disc-shaped fluid diverter for fluidically joining the fluid passage in the shaft with the fluid conduit in the housing. The fluid diverter is arranged at the open-end of the shaft and includes a concentric hollow pilot portion extending at least partially, within the fluid passage in the shaft. The fluid diverter defines a series of open-ended channels which radially extend from and are joined in fluid communication with the hollow pilot portion. At least one port extends from the channel to direct lubrication toward the bearings supporting the shaft. Annular seals provided at the radial edges of the disc-shaped fluid diverter facilitate fluid flow between the channels in the diverter and the fluid passage in the housing.

7 Claims, 2 Drawing Sheets

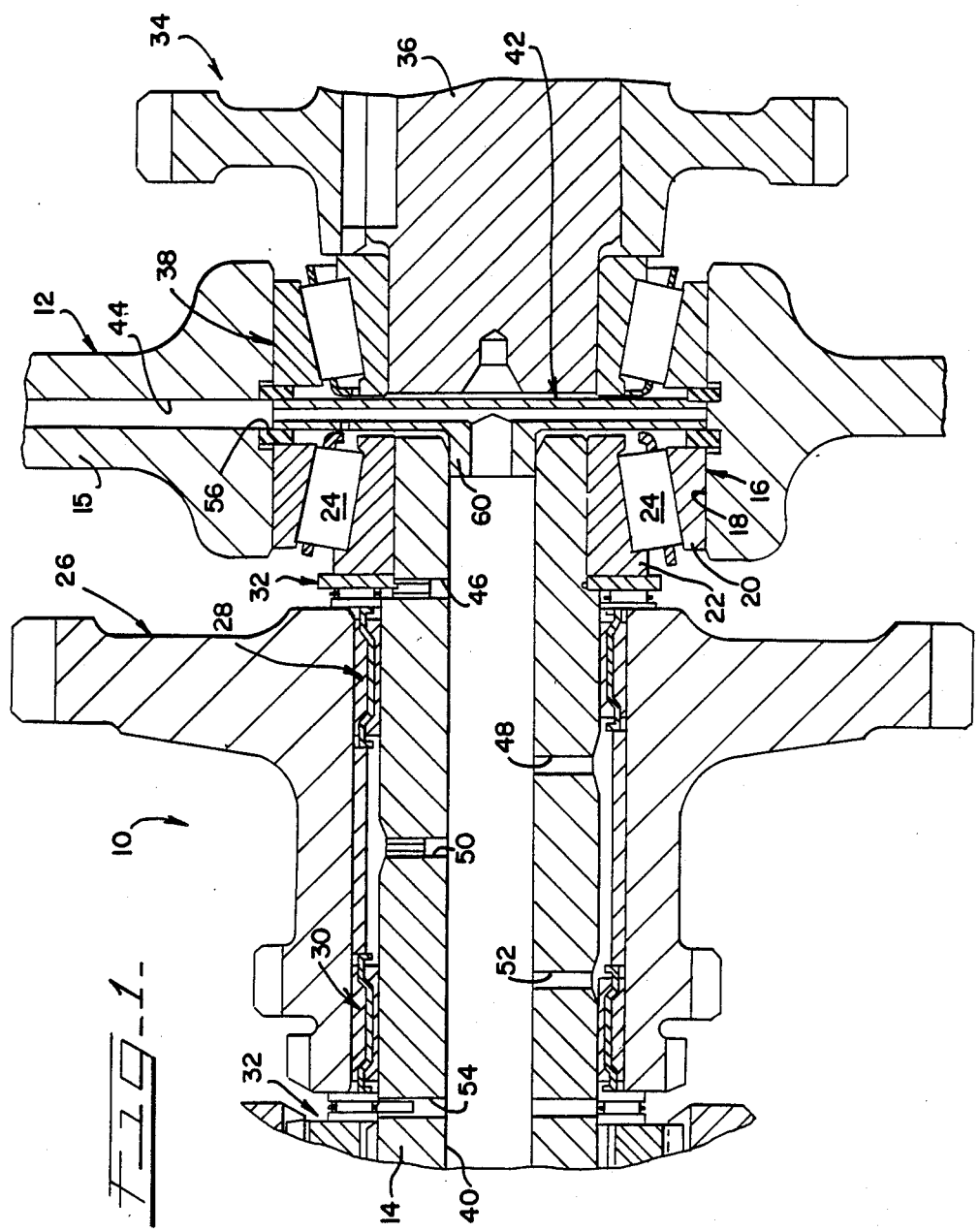

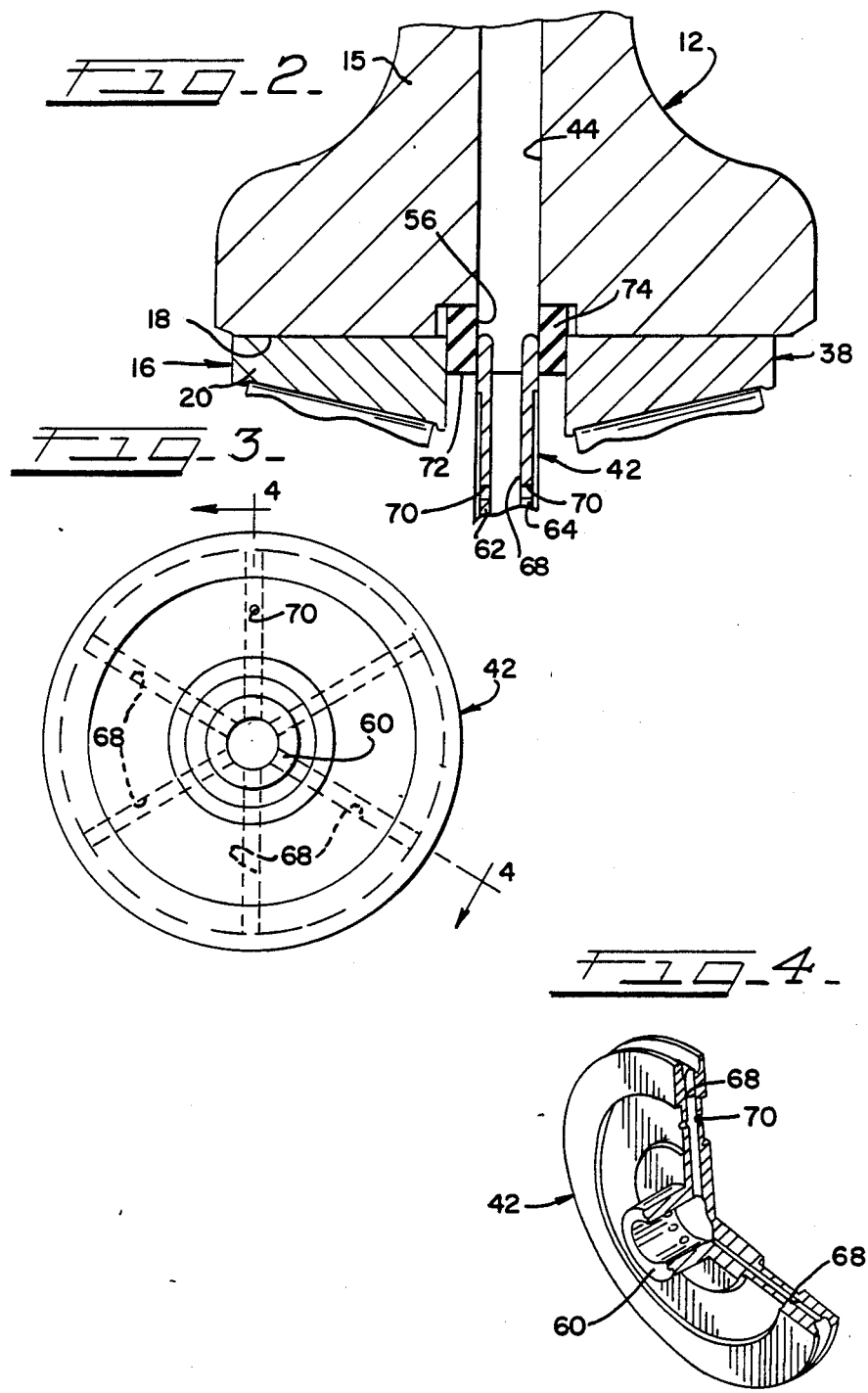

LUBRICATION SYSTEM FOR A TRANSMISSION MECHANISM

FIELD OF THE INVENTION

The present invention relates to lubrication systems and, more particularly, to an apparatus for improving fluid flow between fluid passages comprising the lubrication system of the power transmission.

BACKGROUND OF THE INVENTION

Many machines include at least one mechanism having a shaft rotatably mounted in a housing. Such a shaft typically supports one or more rotatable members thereon. In a transmission, a shaft may rotatably support one or more gears in axial alignment.

As will be appreciated, relative rotation between parts or members of a mechanism can result in friction and heat. Friction and heat are two undesirable consequences which can lead to wear of the parts and, eventually destruction of the mechanism. Bushings and/or bearings are commonly used throughout a machine to reduce friction between relatively rotating members of a mechanism. A lubricating fluid is typically delivered to the rotating members to further reduce friction and heat.

Various lubrication systems for delivering fluid through a machine and to the rotating members are known. Some lubrication systems include interconnected tubing and the like for delivering fluid from one location to another. Other lubrication systems have an axially extending fluid passage defined by a shaft for directing fluid from one location to another.

Those lubrication systems which use an axially extending fluid passage in a shaft for delivering fluid between locations typically have an open end of the fluid passage arranged in a fluid receiving chamber. Fluid pressure is created in the chamber resulting from fluid directed thereto. The pressure in the chamber causes fluid to be delivered through the fluid passage in the shaft.

Depending on the design of the particular machine, it is not always possible to accommodate the open-end of a fluid passage defined by a shaft within a fluid receiving chamber. Some machine designs require two shafts to be arranged in an end-to-end relationship. Where the terminal end of the shaft having the axial fluid passage is not accommodated within a fluid receiving chamber, the open ended passage is normally positioned proximate to a fluid supply conduit defined by a machine housing to establish a fluid connection therebetween.

Effective lubrication can be complicated by bearings used to reduce friction between the rotating shaft and the housing, which are typically arranged at the ends of the shaft. These bearings increase the radial spacing between the fluid passage defined by the shaft and an open-end of the fluid conduit in the housing. As will be appreciated, the efficiency of the fluid connection between the open-ended fluid passage in the shaft and the fluid conduit is reduced as a function of the radial distance separating the fluid passage and the fluid conduit. Moreover, most of the fluid passing from the fluid conduit in the housing passes through the bearings thereby reducing the fluid flow to the axial passage in the shaft.

SUMMARY OF THE INVENTION

In view of the above, and in accordance with the present invention, there is provided a fluid diverter for enhancing fluid flow in those machines which have an axially extending fluid passage in a shaft as part of a lubrication system. The fluid diverter is provided at one end of the shaft to fluidically join an open-ended fluid passage defined by the shaft with a fluid conduit defined by the housing.

The present invention generally relates to a lubrication system for a mechanism forming part of a machine. Generally stated, the mechanism includes an axially extending shaft rotatably supported by bearings in a housing. The shaft may have one or more rotatable members supported thereon. If the machine, wherein the present invention finds utility, is a transmission, the mechanism may be in the form of a gear train wherein the rotatable members on the shaft are gears forming part of a gear train.

The shaft on which the rotatable members are mounted defines an axially extended, open-ended fluid passage. The passage includes one or more spaced ports through which fluid is exhausted to lubricate each of the rotatable members arranged on the shaft. The fluid passage in the shaft is fluidically joined to a fluid conduit in the housing. The fluid conduit is defined in a web or wall of the housing and extends generally orthogonal to the rotational axis of the shaft. An open-end of the fluid conduit is arranged proximate to the open-end of the fluid passage defined by the shaft.

The fluid diverter of the present invention is arranged at the open-end of the shaft to join in fluid communication the fluid passage in the shaft and the fluid conduit defined by the housing. Preferably, the fluid diverter is a disc shaped member having a concentric hollow pilot portion extending, at least partially, within the fluid passage in the shaft. The fluid diverter further defines a series of open-ended channels which radially extend from and are joined in fluid communication with the hollow pilot portion. These fluid channels and the hollow pilot cooperate to direct fluid flow to the fluid passage in the shaft from the fluid conduit in the housing.

To facilitate lubrication of the bearings supporting the shaft, the fluid diverter may further include one or more ports defined by the disc shaped member. These ports extend from at least one of the radially extending open-ended channels for permitting a fluid flow to be delivered to the bearings.

In a preferred form of the invention, the fluid diverter has side flanges which radially extend from the pilot portion of the fluid diverter and between which the radial channels are provided. The diameter of the fluid diverter is substantially equal to the diameter of adjacent bearing supporting the shaft. An outer radial edge of each side flange on the fluid diverter is substantially sealed to the housing to facilitate fluid flow between the channels in the diverter and the fluid passage in the housing.

The fluid diverter of the present invention improves fluid flow between the fluid conduit in the housing and the open-ended fluid passage defined by the shaft. Moreover, the fluid diverter substantially eliminates the necessity of terminating a shaft in a fluid receiving chamber defined by the housing to facilitate flow through an axial passage provided in a shaft.

Numerous other features and advantages of the present invention will become readily apparent from the following detailed description, the accompanying drawings, and the appended claims.

BRIEF DESCRIPTION OF THE DRAWINGS

FIG. 1 is longitudinal sectional view of a lubrication system including a fluid diverter arranged at the end of a rotating shaft;

FIG. 2 is an enlarged fragmentary view illustrating seals used to enhance fluid flow between the fluid diverter and a fluid conduit defined by a housing of a machine;

FIG. 3 is a side elevational view of a fluid diverter according to the present invention; and FIG. 4 is a perspective view, partly in section, of a fluid diverter according to the present invention.

DETAILED DESCRIPTION OF A PREFERRED EMBODIMENT

While the present invention is susceptible of embodiment is various forms, there is shown in the drawing, and will hereinafter be described a presently preferred embodiment with the understanding that the present disclosure used to be considered as an exemplification of the invention and is not intended to limit the invention to the specific embodiment illustrated.

Referring now to the drawings, wherein like reference numerals indicate like parts throughout the several views, a mechanism 10 is rotatably arranged in a housing 12. Mechanism 10 is illustrated as being part of a gear train assembly for a tractor transmission or the like. The illustrated mechanism may be one of a series of such mechanisms arranged within the transmission.

As illustrated, mechanism 10 includes an axially extended shaft 14 which is rotatably mounted within housing 12 of the transmission. In the illustrated embodiment, shaft 14 is mounted on one side of a transverse wall or web 15 in housing 12 by a suitable bearing 16. Bearing 16 is, accommodated within an aperture 18 defined by wall 15 and is illustrated as an anti-friction bearing. Anti-friction bearing 16 comprises an outer race 20, an inner race 22, and a series of rollers 24 suitably arranged between the outer and inner races.

Mechanism 10 further includes a rotatable member 26 arranged on shaft 14. As illustrated, member 26 defines a combination gear forming part of a gear train. To reduce friction, a pair of axially spaced bearings 28 and 30 are disposed between the shaft 14 and member 26. Moreover, thrust bearings 32 may be provided at opposite ends of the member 26 for reducing friction and heat.

Another mechanism 34 may be arranged on the opposite side of wall 15 in housing 12. Mechanism 34 may be substantially similar to mechanism 10 in that it includes a rotatable shaft 36 which is mounted in housing 12 by suitable bearings 38. The shafts 14 and may be arranged in a substantial end-to-end relationship relative to each other.

A lubrication system is provided to further enhance performance of the machine by reducing friction between the relative rotating parts of the mechanism. As illustrated, the lubrication system includes an axially extended, open-ended fluid passage 40 defined by shaft 14. A fluid diverter 42 fluidically joins the fluid passage 40 with a fluid conduit 44 defined by housing 12.

As illustrated in FIG. 1, fluid passage 40 is provided with a series of axially spaced ports 46, 48, 50, 52, and 54 from which fluid is exhausted. Each port opens to an area proximate to a bearing which is to be provided with lubricant in a manner reducing friction and heat between the relatively rotating members.

Fluid conduit 44 is typically defined by the transverse wall 15 of housing 12 and extends generally orthogonal to the elongated fluid passage 40 defined by shaft 14. Preferably, the fluid conduit 44 is provided in web 15 of housing 12 such that its open-end 56 is substantially aligned with the terminal end of shaft 14.

Fluid diverter 42 is arranged at the open-end of the shaft 14 to fluidically join the fluid passage 40 with the fluid conduit 44. Particularly as illustrated in FIGS. 3 and 4, the fluid diverter 42 has a disc shape with a concentric hollow pilot portion 60. As illustrated in FIG. 1, the hollow pilot portion 60 axially extends, at least partially, within the fluid passage 40 defined by shaft 14.

In a preferred form, the fluid diverter 42 has side flanges 62 and 64 which radially extend from pilot portion 60. Notably, and as illustrated in FIG. 2, the outside diameter of flanges 62, 64 is substantially equal to the outside diameter of the outer race 20 of bearing 16 arranged adjacent to the diverter. Fluid diverter 42 further defines a series of equally spaced, open-ended channels 68 between the flanges 62 and 64. These channels radially extend from and are joined in fluid communication with the hollow pilot portion 60 of the fluid diverter 42.

To facilitate lubrication of bearings 16 and 38, the fluid diverter 42 is provided with one or more ports 70. Each port 70 is radially spaced from the hollow pilot portion 60 and extends from at least one of the open-ended channels 68 for permitting a fluid flow to be delivered to the bearings 16.

Turning to FIG. 2, to promote fluid flow between the fluid conduit 44 and channels 68 of the fluid diverter 44, annular seals 72 and 74 are disposed at an outer radial edge of each flange 62, 64, respectively. The seals 72, 74 are held against the respective outer edges of flanges 62, 64, respectively, by the outer race of bearings 16, 38. The seals, 72, 74 retard fluid from escaping about the sides of the fluid diverter 44 and direct fluid flow between the channels 68 in the diverter 44 and the fluid passage 44.

Although the terminal end of shaft 14 is not received within a fluid receiving chamber, the fluid diverter 42 properly channels fluid between the fluid conduit 44 and fluid passage 40. The radial ports 46 through 54 leading from fluid passage 40 direct lubricant to various parts of the mechanism so as to reduce friction and heat. Similarly, port 70 directs fluid to the bearing 16 and 38 in a manner reducing friction and heat. Moreover, seals 72 and 74 facilitate the flow of lubricant between channel 68 of fluid diverter 42 and fluid conduit 44.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed:

1. A lubrication system for a mechanism requiring lubrication, said mechanism including an axially extended shaft rotatably mounted by bearings in a housing, said shaft having a member rotatably supported thereon, said lubrication system comprising:

an axially extended, open-ended fluid passage defined by said shaft, said passage including at least one port through which fluid is exhausted to lubricate the member on the shaft;

a fluid conduit defined by said housing, an open-end of said conduit being radially spaced from the open-end of said shaft; and fluid diverter means arranged at the open-end of said shaft for fluidically joining the fluid passage and the fluid conduit, said fluid diverter means including a concentric hollow pilot portion extending at least partially within said fluid passage, said fluid diverter means further defining at least one open-ended channel radially extending from and joined in fluid communication with said hollow pilot portion for directing fluid flow between the fluid conduit and the fluid passage.

2. The lubrication system according to claim 1 wherein said fluid diverter means and one of said bearings positioned adjacent thereto, have substantially equal diameters.

3. The lubrication system according to claim 1 wherein said fluid diverter means further defines port means joined in fluid communication with said open-ended channel for delivering a fluid flow to said bearings.

4. The lubrication system according to claim 1 wherein said fluid diverter means further includes side flanges radially extending from said pilot portion, with an outer radial edge of each flange being substantially sealed to said housing to facilitate fluid flow between the channel of said diverter means and said fluid passage.

5. A lubrication system for a mechanism including a shaft rotatably mounted by bearings accommodated within a bore defined by a housing, said lubrication system comprising:

a fluid conduit defined by said housing and opening to said bore accommodating said bearings; and fluid diverter means arranged within said bore defined by said housing at an end of said shaft and adjacent one of said bearings, said diverter means having a disk-like configuration including side flanges which define a series of radially extending passage means therebetween for directing fluid flow from said fluid conduit to lubricate said adjacent one of said bearings thereby reducing frictional characteristics of said bearing.

6. A lubrication system according to claim 5 wherein said passage means includes a radially extending channel opening to said fluid conduit and port means joined in fluid communication with said channel and opening proximate to said adjacent one of said bearings.

7. A lubrication system for a mechanism including a shaft rotatably mounted by bearings accommodated within a bore defined by a housing, said lubrication system comprising:

a fluid conduit defined by said housing and opening to said bore accommodating said bearings; and fluid diverter means arranged within said bore defined by said housing and adjacent one of said bearings, said diverter means includes spaced side flanges and defines passage means for directing fluid flow from said fluid conduit to lubricate said adjacent one of said bearings thereby reducing frictional characteristics of said bearing, with an outer radial edge of each side flange being substantially sealed to said housing to facilitate fluid flow between said fluid conduit and said passage means defined by said fluid diverter means.

* * * * *